United States Patent [19]

Flynn

[11] Patent Number: 4,527,754
[45] Date of Patent: Jul. 9, 1985

[54] NON-THERMAL EXPANDING SPOOL FOR CARBON FIBER OXIDATION

[75] Inventor: Robert J. Flynn, Greer, S.C.

[73] Assignee: E. I. Du Pont de Nemours and Company, Wilmington, Del.

[21] Appl. No.: 526,667

[22] Filed: Aug. 26, 1983

[51] Int. Cl.³ .............................................. B65H 75/02
[52] U.S. Cl. ................................ 242/118.1; 68/198
[58] Field of Search ............... 242/118, 118.1, 118.3, 242/118.32, 118.2; 68/198

[56] References Cited

U.S. PATENT DOCUMENTS

| | | | |
|---|---|---|---|
| Re. 27,794 | 10/1973 | Otani | 264/29 |
| 2,162,841 | 6/1939 | Dunlap | 242/118.1 |
| 2,217,459 | 10/1940 | Slaughter | 68/198 |
| 2,633,729 | 3/1945 | Slaughter | 68/198 |
| 3,054,428 | 9/1962 | Crawford | 242/118.32 X |
| 3,997,929 | 12/1976 | Schultheiss et al. | 242/118.1 X |
| 4,208,267 | 6/1980 | Diefendorf et al. | 208/22 |
| 4,351,816 | 9/1982 | Schulz | 423/447.4 |

Primary Examiner—Stephen Marcus
Assistant Examiner—Leo J. Peters

[57] ABSTRACT

The disclosure concerns a non-thermal expanding spool for use in oxidation of green spun carbon fibers, subsequent to fiber spinning and prior to carbonization. The spool is a hollow tube formed on a mandrel from a multi-ply, multi-directional woven graphite cloth impregnated with a thermosetting resin, e.g. polyimide. Then a plurality of hoop fiber filaments are wrapped around it which also become impregnated with the thermosetting resin. The resulting tube or spool is then baked or cured at elevated temperatures. The baked spool is then provided with a large number of geometrically or randomly disposed holes or openings.

7 Claims, 3 Drawing Figures

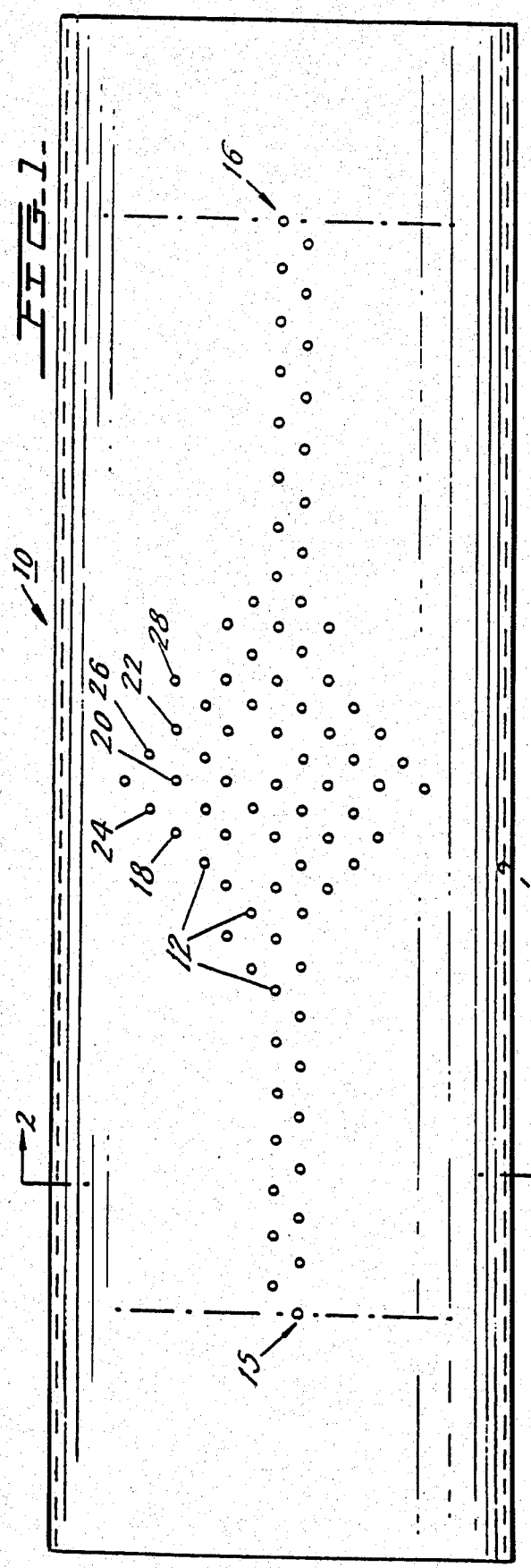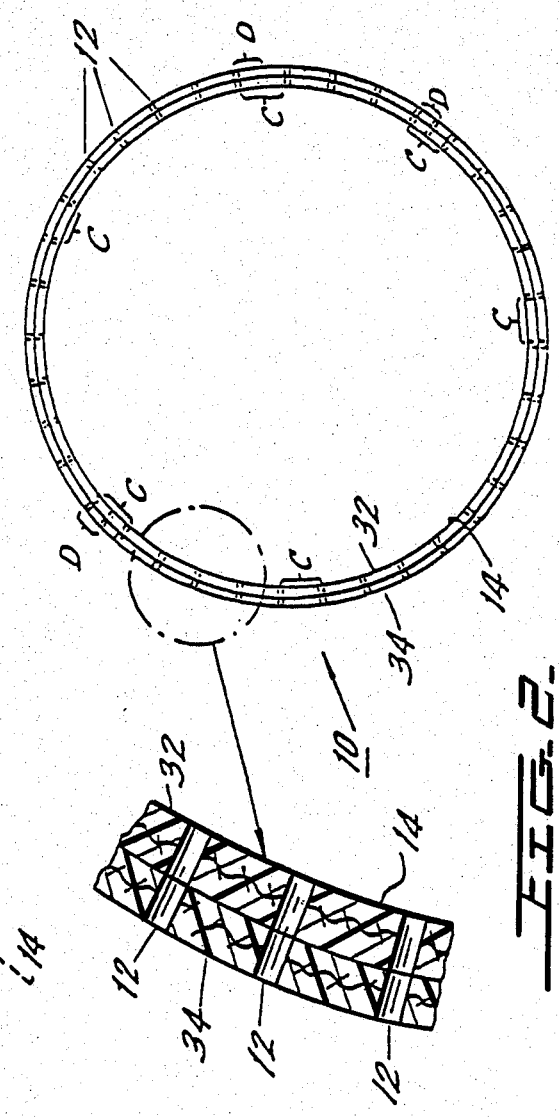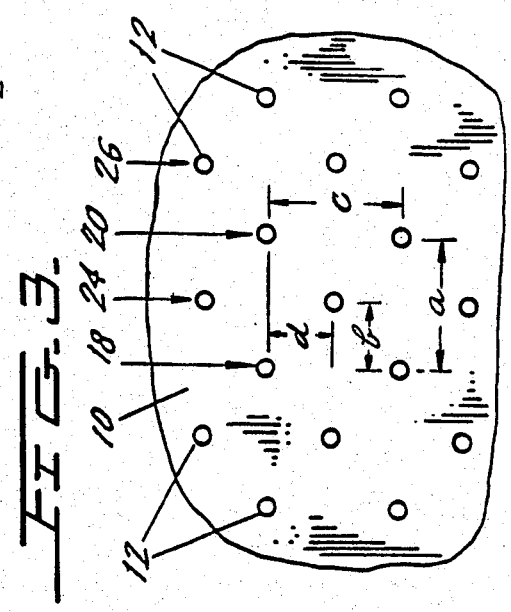

NON-THERMAL EXPANDING SPOOL FOR CARBON FIBER OXIDATION

BACKGROUND OF THE INVENTION

The present invention relates generally to the processing of carbon fibers from a carbonaceous pitch, and more particularly to the oxidation or thermosetting stage in the formation of said fibers and specifically to a spool used for holding the fibers during oxidation.

What is referred to as carbon fiber is produced by first spinning an anisotropic pitch (or fraction of such pitch) for producing fiber, oxidizing or thermosetting the "green" fibes, and thereafter carbonizing the oxidized fibers at a high temperature. See U.S. Pat. No. Re. 27,794 and U.S. Pat. No. 4,208,267 for descriptions of this process.

The oxidation or thermosetting of the green fibers is a critical step in this process because the green fiber undergoes specific known chemical changes which permit the development of high tensile strength in the finished carbon fiber. Moreover, an oxidized carbon fiber is easier to handle than an unoxidized green fiber. There is an increase in tensile strength. For example, an unoxidized fiber would have a tensile strength of approximately 5 ksi, whereas the same fiber after oxidation would have a tensile strength of approximately 15 ksi.

Presently, for oxidizing carbon fiber made from petroleum or coal-derived oil pitch, it is the practice to pass the as-spun green fiber through a heated zone using low tension or move it on a conveyor belt. For 10 to 15 micron fiber, an oxidation time of one hour is necessary due to the diffusion time of oxygen into the fiber. Oxidizing agents may be used to decrease this time and to improve the efficiency of the oxidation or thermosetting step. However, it would be advantageous if it were possible to oxidize effectively the fibers on a spool, since this would be a more economic oxidation as well as facilitating the process.

To oxidize efficiently a maximum length of carbon fiber it would be desirable to concentrate the fiber in an oxidizing environment. This may be done by winding the fiber on a spool or bobbin. The outer coils of wound fiber may block oxidation of the inner wound coils, and therefore the spool has to be designed to avoid this problem.

Oxidation on a spool obviates the need for the elaborate equipment needed to oxidize the green fiber obtained from the spinning stage. Also, due to the greater packing density, the length of time required to process the material is much smaller when the material is on a spool. For example, a one-pound spool of 1,000 filaments contains 8,635 feet of fiber. A presently used oxidation oven for unwound fiber would be at least 50 feet in length and the retention time of the fiber in that oven would be one hour or more. Therefore, it would require about 172 hours to process this package of fiber, in contrast to about 4 hours required for a spool oxidation cycle of the same amount of filaments by practicing the present invention.

The spool on which the carbon fiber is to be wound for oxidation obviously should not be damaged during the oxidation process and should not, in turn, damage the carbon fiber. More specifically, the spool must withstand the elevated temperatures of oxidation of the carbon fiber without undesirable sagging, collapse, expansion or other deformation. The elevated temperatures utilized for oxidation are generally in excess of 230° C. and up to about 330° C. Commercially available spools are of materials which expand when subjected to such oxidation temperatures and the diameters of the spools would increase. This will have a number of undesirable results. Firstly, when the spool expands it pulls the wound fiber tighter, which inhibits penetration of oxidizing gas through the bundle of fiber. Secondly, the fiber might be caused to fuse or break, if the spool expands inside the wound fiber. In addition, there is also the possibility that the fiber itself may suffer 1-2% shrinkage during oxidation, which would compound the problems caused by spool expansion.

U.S. Pat. No. 4,351,816 describes a spool for holding oxidized or thermoset carbon fibers during the much higher temperature carbonizing step, which follows the oxidation step here under discussion. The patent describes the bobbin there as being comprised of a carbon or graphite material. However, the material of the bobbin of this invention is not suggested, and there is no indication that the characteristics of the present bobbin were obtained.

OBJECTS OF THE INVENTION

Accordingly, it is the primary object of the present invention to provide a spool which is useful for holding green spun carbon fiber during the oxidation stage, which occurs after spinning and before carbonizing.

It is another object of the invention to provide such a spool which will avoid damaging the carbon fiber on the spool being oxidized.

It is yet another object of the invention to provide such a spool which will not expand or increase its diameter during oxidation.

It is a further object of the invention to provide such a spool which will enable exposure of all of the fiber wound on the spool to the oxidizing gas.

These and other objects will be apparent from the following description of the present invention and to preferred embodiments of spools according to the invention considered in conjunction with the accompanying drawings.

SUMMARY OF THE INVENTION

The spool of the invention for supporting the wound carbon fiber during oxidation comprises an open-ended hollow tube with a relatively thin wall thickness. Numerous holes, slots or the like openings extend through the tube wall and are arrayed along and around virtually the entire length of the tube. A pattern is selected for the openings to control the passage of the gas. The openings permit the oxidizing gas, e.g. oxygen or air, to evenly penetrate the wound green carbon fiber, as the oxidizing gas can pass from inside the tube out through these openings and the gas can also communicate from the exterior of the tube.

The spool itself is formed from a plurality of successive layers of woven carbon cloth surrounded by a plurality of layers of hoop fibers. The woven carbon cloth is impregnated with a high temperature thermosetting resin. The carbon cloth layers are wrapped on a tubular mandrel. The hoop graphite fibers are wound around the cloth and some of the resin on the cloth migrates into the hoop graphite fibers also impregnating them. After the multi-layer spool is formed as above, it is cured by baking for thermosetting the resin. The mandrel is removed and then the above described openings are formed in the spool.

After thermosetting of the impregnated resin during fabrication of the spool, the resin must be capable of withstanding elevated oxidizing temperatures in excess of 230° C. so that the resulting cured carbon fiber composite will have no thermal expansion at least up to, and preferably beyond, the oxidation temperature of the carbon fibers ultimately wound on the spool. Preferably, for example, the spool will have no thermal expansion up to 330° C. Further, the composite material should have a long service life even at these elevated temperatures.

BRIEF DESCRIPTION OF THE DRAWINGS

FIG. 1 is a side elevational view of a spool according to the invention;

FIG. 2 is a cross-sectional view thereof along the line 2—2 in FIG. 1; and

FIG. 3 is an enlarged fragment of FIG. 1.

DESCRIPTION OF A PREFERRED EMBODIMENT

A typical spool according to the present invention is a structure like that shown in the drawings. The spool 10 is an open-ended multi-layer but integral hollow tube having a number of holes 12 arrayed along its length and around its entire circumference for permitting oxidizing gas to penetrate through the holes from within the hollow 14 of the tube 10. Although holes have been illustrated, slots or any other shape opening can be used which will allow the passage of the oxidizing gas. The particular size and shape and arrangement of openings would be selected by one skilled in the art for optimum passage of oxidizing gas therethrough for satisfactory oxidation of the wound green carbon fiber. A spool may have as many as 5,000 holes through it with a diameter of up to about ⅛".

In one preferred version of the spool 10, it is an open-ended tube 15" in length, 5.625" in diameter and having a wall thickness of 0.062", whereby its wall is quite thin in comparison with its diameter. Some of the holes 12 in the spool have been illustrated. This spool is provided with 1,620 holes of 0.062" diameter arrayed completely around the circumference of the spool and in circumferential rows extending along the length of the tube over a total distance of 11", with the first rows 15, 16 of holes at each end being spaced a short distance of about 2" in from the respective ends of the tube. The holes in a first group of alternate circumferential rows 18, 20, 22 along the tube are axially aligned, while the holes in the second group of alternate circumferential rows 24, 26, 28, et al. along the tube are also axially aligned. But, the holes in the second group are circumferentially staggered from the holes of the first group. Alternate first group rows 18, 20, 22, et al., on the one hand, and alternate second group rows 24, 26, 28, on the other hand are spaced a distance a, ½", apart axially of the spool while each of the second group rows 24, 26, et al., is spaced axially of the spool a distance b, ¼", from the adjacent first group rows 18, 20 or 20, 22, et al. In the circumferential direction, the holes in any one row 18, 20, 24 or 26, et al. are circumferentially spaced an angular distance c, 10°, apart, which amounts to about ½" distance, while the holes in each circumferential row, e.g. 24, are staggered circumferentially an angular distance d, 5°, from the positions of all of the adjacent holes in the next adjacent rows 18, 20. The above-described array of holes has been found particularly effective for controlling the passage of the oxidizing gas.

The spool includes a plurality and particularly of at least two successive plies of graphite multi-directional, and particularly bi-directional woven cloth at ±45° angle, jointly indicated at 32. The cloth is covered by a plurality and particularly of four or more layers of hoop graphite filament, jointly indicated at 34. Before the layers are applied upon each other and are formed in a tube, the woven carbon cloth is impregnated with an uncured, high temperature thermosetting resin capable of withstanding elevated temperatures in excess of 230° C., once the spool and its resin have been thermoset by heat curing. Examples of such resins are polyimides (addition or reactive types), phenolics, epoxy/phenolic blends, polyphenylenes, polyphenylene oxides or sulfides, polysulfamide; polysulfones and the like. The hoop graphite fibers become impregnated with the resin after being wound on the woven carbon cloth.

In a spool embodiment according to the invention, the graphite fibers are obtained either from Hercules Chemical Corporation, AS-4W-6K or from Union Carbide Corporation, P-300. The polyimide impregnating resin is SKYBOND-703.

In forming the spool, the plies of resin impregnated woven cloth are wrapped around a tubular mandrel (not shown). Then the layers of hoop graphite filament are wound around the cloth. Some of the resin in the cloth migrates into the hoop graphite filaments impregnating them.

The spool, and particularly its thermosetting resin, is cured, i.e. baked in a curing oven, using the following schedule:

1 hr. @ 150° F.
1 hr. @ 250° F.
2 hr. @ 350° F.
4 hr. @ 400° F.
4 hr. @ 500° F.
4 hr. @ 600° F.
4 hr. @ 650° F.

This produces a carbon fiber composite spool.

After the curing, the forming mandrel is removed from the tube.

The above described geometric pattern of holes are formed in the layers, by being drilled through them in the pattern illustrated in the drawings by a standard punching tool, after the layers have been formed into the tube and preferably after the tube has been baked or cured.

The composite spool of the invention was tested for expansion, that is, for change in diameter. The composite spool was measured cold at ambient temperature, and it was subsequently measured immediately after being heated to 330° C. The tested spool showed no change in diameter.

Comparison expansions were determined with spools of the same size but comprised of other materials. In the following table, the expansion in the circumference of a 6" diameter spool made with various materials, at ambient temperature and 330° C. is indicated.

| Material | Expansion in Circumference of Diameter Spool (inches) |
| --- | --- |
| Zirconium 702 | 0.031 |
| Aluminum | 0.133 |
| 304 Stainless Steel | 0.098 |
| Carbon Steel | 0.064 |
| Carbon Fiber Composite | 0.000 |

| Material | Expansion in Circumference of Diameter Spool (inches) |
| --- | --- |
| (The Invention) | |

There has just been described an improved spool for supporting wound green carbon fiber during their oxidation. The spool is formed from a carbon fiber composite, impregnated with a high temperature thermosetting resin. Once the spool and its resin are heat cured, the spool does not expand during oxidation of carbon fiber wound on the spool, preserving the carbon fiber against damage. The spool has an array of holes through its surface for permitting oxidizing gas to pass through the spool, whereby the wound carbon fiber may be fully exposed to oxidizing gas.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A non-thermal expanding spool for use in carbon fiber oxidation, or for the like purposes, the spool comprising:

a hollow tube comprised of a carbon fiber composite with a high temperature thermosetting resin impregnated in it, said resin being selected from the group consisting of polyimides, phenolics, epoxy/phenolic blends, polyphenylenes, polyphenylene oxides, polyphenylene sulfides, polysulfamides, and polysulfones;

the tube having openings through it, which are arrayed along the length of the tube and around the circumference of the tube, for enabling controlled passage of oxidizing gas through the openings.

2. The spool of claim 1, wherein the tube has opposite ends which are open.

3. The spool of claim 1, wherein there is a large plurality of the openings which are relatively small in diameter size.

4. The spool of claim 1, wherein the tube has ends which are open, the tube is about 15 inches in length, is about 5.625 inches in diameter and has a wall that is about 0.062 inch thick; the opening comprising about 1,620 holes of about 0.062 inch diameter arranged in circumferential rows which are spaced axially apart about ¼ inch along the tube, in each row, the holes are circumferentially spaced apart about 10°, and in adjacent circumferential rows, the holes are staggered such that a hole in one row is circumferentially spaced about 5° from the adjacent holes in the next adjacent circumferential rows.

5. The spool of claim 1 wherein the carbon fiber composite is a two-ply graphite bi-directional woven cloth at ±45° angle with four layers of hoop fiber graphite filament around the woven cloth, both the cloth and the layers of filament being impregnated with the resin.

6. The spool of claim 1, wherein the carbon fiber composite is a multi-ply graphite, multi-directional woven cloth with a plurality of layers of hoop fiber graphite filament around the cloth, both the cloth and the layers of filament being impregnated with the resin.

7. The spool of claim 6, wherein the woven cloth is a two-ply graphite, bi-directional woven cloth at ±45° angle.

* * * * *